Patented July 19, 1932

1,868,085

UNITED STATES PATENT OFFICE

WILLIAM R. WHITEHORNE, OF LEWISTON, MAINE

PHOTOGRAPHIC PRINT

No Drawing. Application filed February 21, 1927. Serial No. 170,056.

In the preparation of colored photographic prints there has long been sought a means of imparting color to a black and white print, or if the print has what might be called an original color or shade, in changing that color or shade to another color or shade.

This was accomplished in two general ways. One was to substitute for the original metal deposited in the print another metal, or to form from the salt of the original metal another salt, in each case producing a metallic resultant of the color desired. Such methods, as I understand them, were chemical substitutions and are to be sharply distinguished from my present invention in which I use a dye principle, as will be hereafter described.

Now, the art of dyeing prints heretofore has dealt principally, if not exclusively, with the dyeing or staining of the gelatine or other film forming media. Such dyeing or staining has been extremely crude. The staining of the film all over the print gave only a general color to the picture in which the high light was colored even more than the detail of the picture, so that the real detail of the picture was practically uncolored and no advantage of detail gained at all, the only effect being a general effect produced on the eye as to the picture as a whole, and generally somewhat at a sacrifice to the photographic detail which really constituted the important part of the picture.

In another phase of effort dyes were produced which would color or stain soft gelatine without staining hard gelatine or only staining it to a lesser degree. This only produced results by laborous methods and was also inefficient as to ultimate photographic detail.

There has been another line of effort which, as I understand it, has been limited to the field of transparencies, such as lantern slides, in which the slide was treated with a mordant, usually a salt of uranium or some other heavy metal which causes a slight browning of the black of the silver and which will take certain dyes. This was a limited field and the effects produced therein and results were more difficult to produce.

My present invention is applicable to both paper prints and transparencies, such as lantern slides and contemplates the coloring of photographic detail, as by the use of a dye in which the dye takes at each detail locus, by which I mean the dye takes at the point of each particle of the metallic deposit of the print.

It will be immediately apparent that such a system of coloring or dyeing is very different from any general application of color or dye. It has the tremendous advantage of coloring the detail as distinguished from the high light, so that the photographic picture is colored in its detail rather than a mere coloring of the print about the detail.

My present invention or discovery as it may be is based upon the permanent coloring effect of a dye on the details of a print in the manner hereinafter set forth. I realize that any theory advanced by me must be based on present day theories which may or may not be correct, as the progress of science is so rapid as to render the acceptance of any theory as ultimate, a dangerous attitude. I therefore do not wish to be bound by any theory as I am able to explain and teach the method of practicing my invention and to describe the results thereby attained. I will, however, offer herein certain theories which seem to me to be well sustained by the facts because such theories if only tentative will aid in an understanding of the practical processes of my invention and will guide those skilled in the art in practicing the many variants that are possible with my invention, all of which modifications and variants seem to be in accord with the general theory which I now offer.

I have found that when the silver deposit in a print is bleached with a solution such as will be described later, the silver particles are converted into a complex salt while at the same time the gelatine adjacent to the salt particles is converted into a vigorous mordant for dyes of the Alizarin type properly prepared as is explained later, by adding sufficient very dilute caustic alkali to make the pH value of the dye bath approximately 9.0. Also, as hereinafter explained, I preferably use a small amount of dilute ammonium hydrate either in the dye itself or on the print prior to dyeing. With some dyes the ammonia might be used as the alkaline factor but with many it produces a change of color which the use of the caustic alkali prevents. If now a dye of a certain class be applied to the print the dye takes at the point of the salt particle and becomes fixed there. I am unable to say whether this is due to the insolubility of the salt or to a mordant effect of the salt by reason of which the adjacent film of gelatine surrounding the salt particle is dyed. I would, however, point out that the dye does not dye the gelatine or other film medium generally, neither does it dye the paper. When I therefore refer to the mordant effect of the salt it will be understood that the expression is used generally to indicate the effect, or resultant effect, without intending to place any dependence on any chemical or physical changes that may take place as may be hereafter discovered. The effect is perfectly definite and positive and the result is the long desired result that a definite predetermined dye or color can be introduced permanently into each of the countless loci of the metallic deposit which goes to make up the photographic detail. The result is that I am able to obtain an absolute color replacement by which I am able to substitute for the black or grey or other color of the original print a predetermined definite color in which I desire to have the picture appear. More than this, as I will hereafter explain, my method is so faithful in minutiæ that I am able to bring out by my arbitrarily introduced color details which were faint or even invisible.

In the practice of my invention I take a print whether it be lantern slide or paper print and first bleach it by an acid bleach to convert the metallic salt of the print to a colorless salt. For example, I may use as a bleach for an ordinary silver print, a solution made on the following formula: 200 c. c. of water, 3.2 grammes of $CuSO_4$, 3.2 grammes KBr, .25 grammes $CrO_3$.

While I am not able to describe the metallic salt remaining in the print after this bleaching treatment, it will be apparent to those skilled in the art that it is obviously a highly complex salt, probably a double or multiple salt. I believe that this is an acid salt, and in fact, I would point out in connection with my tentative theory that the acidity of this salt may be one of the factors of success in my invention. I also note at this point that as a matter of practice such a bleaching solution as that above indicated must be fresh in order to get the best results. This leads me to believe that such a solution when freshly mixed forms some rather unstable bromin compound upon the vigor of which depends the reaction with the metal salt in the print from which comes the colorless salt possessing that peculiar property which I have referred to as mordant either actually or by analogy. (It will be understood that the print heretofore discussed was not a hardened print, no hardening solution having been put in the fixing bath.) The print is then washed free from the bleach solution.

The print is now ready for the dye. In this condition the print will be very faint and in fact much of the detail will be entirely invisible and colorless except as to paper.

At this point it becomes necessary to correct some misapprehensions as to commercial dyes which might be thought useable for this purpose. It will be seen that the dye must not be one which would dye the gelatine and preferably should not be a dye that would dye the paper, as this would tend to degrade the high lights. There are various dyes known that will dye soft gelatine. It has been generally understood that none of the known dyes would dye hard gelatine without dyeing the soft gelatine. By hard gelatine I mean hardened by chromium salts or the like.

At this point it may be well for me to note that in the bleaching before referred to the gelatine has been hardened at the point where the silver exists, the rest of the gelatine remaining soft. I have not as yet determined the full list of dyes available for this purpose and at this point I feel it better not to attempt a theoretical discussion of the chemistry involved. The dyes that I have already employed are as I understand them synthetic organic dyes of coal tar derivation. I have not been able to operate successfully with all such dyes and I do not know from my present limited source of information what the formulæ are of those that I have used successfully nor of those that I have not been able to work. For those who at present possess this information and for those who will subsequently come into the possession of this knowledge, the class of the dye should readily be determinable and the formulæ of the dyes will doubtless indicate the correct theory for the reaction which takes place in bringing about the result which I will now describe.

The class of dyes used by me as above described are, generally speaking, Alizarin dyes or dyes of that type. As a red I have used Alizarin Rubinol which is a sodium salt of 4 - o - sulpho-tolyl-amino-1-anthra-N-methyl pyridone. The Alizarin green, Alizarin blue and Alizarin yellow are of the same complex character.

Whatever the formulæ of these commercial dyes, identified as above, I am able according to my invention or discovery to get a very perfect coloring of the print in the absolute detail of the photographic reproduction. It is to be noted that this is in the region of the hardened gelatine and that I am able to avoid any coloring of the softer gelatine by the observation of the following conditions.

The conditions as I have observed and noted them are generally as follows. The dye in its commercial form is a powder. In strong solution, such for example as would be used in the textile art, it will dye the softer gelatine at the same time that it dyes the photographic detail. If, however, diluted say to three or four volumes, the dye becomes ineffective on the softer gelatine, while active in the photographic detail. Here it is effective either by dyeing or changing the color of the metallic salt left by the bleaching or possibly by a dyeing of the gelatine due to presence of the salt or both. As stated above, I am unable to state just what takes place, but the result is perfectly definite and marked in its result and may be constantly effected.

At this point I desire to particularly point out another observed factor in the practice of my invention. With the dye above mentioned I find it necessary to bring the solution to a slight degree of alkalinity which I effect by the addition of a small amount of ammonium hydrate. As heretofore suggested, I suspect that the metallic salt in the print left by the bleaching step is acid or slightly acid and I believe that the dyes above referred to are acid dyes. At any rate, I find that they apparently will work upon the addition of a small amount of alkaline reagent while if the definite alkalinity is not produced the dye will dye the paper and the soft gelatine also. Furthermore, I would note that where a print has been overdyed by inadvertence so as to color the softer gelatine and the paper, the dye may be removed by the addition of a few drops of ammonia to the wash water. Furthermore and in contra-distinction to this, the taking of the dye in the photographic details is so strong and permanent that I have not been able to remove or diminish it by indefinite soaking, and I believe it to be absolutely permanent according to any usual standards.

I have heretofore referred to the strengthening or intensifying action of my process. This is important in the bringing out of the detail in any print and the effects are very noticeable both as to faint marginal details as well as to detail in heavy shadow which in the ordinary print is undiscernible by reason of its density. From this it will be seen that my process not only recovers the very faint detail of the print where such detail is isolated, as in a very thin portion of the print or in a generally thin print, but will actually bring out such detail in the dense parts of a print or even in a somewhat over exposed print. This detail in addition to its obvious value is so accurate that it brings out those graduations in definiteness in the depth of the picture by which the apparent depth is increased and perspective brought out.

While this is important in any picture my invention has other immediate usefulness in the reclamation of under exposed pictures, as for example in moving picture films photographed under trying light conditions. The negatives of such films may be strengthened either by dyeing or where color is not desired by dyeing and redeveloping thereby restoring the original black and white tone with a very marked intensification of detail apparently due to the fact that there is an additional layer of dye retained by the silver which is proportionate in thickness to the silver layer. This, of course, is not only true of the negative but prints from that negative may further be intensified by dyeing or by dyeing and redeveloping as before described.

My invention is capable of practice in the simplest of manners. For example, the negative to be strengthened or the print to be dyed may be simply bleached, washed and immersed in the dye bath and allowed to remain there until the desired strength of color is brought out. It can then be thoroughly washed to remove any excess dye that may be adherent and the negative or print is then dried and ready for use.

While I have referred particularly in the foregoing to monochrome prints and to the intensification features of my invention, I call attention to the value of such a colored print in multi-color work. Its use in such combination I shall describe and claim in a separate application in connection with my other inventions in multi-color photography as in my prior application Serial No. 52,000, filed August 24, 1925.

While I have specified certain commercial dyes by their commercial names, it will be understood that I do not intend to be limited thereby but I am merely making such reference as the best means of imparting exact information as to my invention and information which is entirely capable of use by others on a more exact and extended basis than I am at present able to give owing to the character of the products involved. I also have given a formula for bleach which is to be understood as illustrative rather than as limiting. This bleach can be variously modified by the substitution of reagents with proper attention to the desiderata heretofore indicated, particularly as to the effect of the bleach in forming a colorless salt in the print, and second in forming a salt which has the "mordant" effect to which I have heretofore alluded. In this connection I also note that there are two ranges of potential shade available in the resultant print according to whether the bleaching step is carried out in daylight or non-actinic light. The daylight exposure gives an ultimate darker print, whereas bleaching carried on under a red light, for example, gives a lighter tone in the ultimate print.

There are two other possibilities under the practice of my method that are possible and as these offer certain factors of advantage in producing variations in effect, I would point them out.

By treating a finished print before final drying with a dilute mineral acid, and washing, the tone of the dye in the resultant print is modified. By treating a bleached and washed print with dilute hypo before dyeing some of the silver salt is removed and gives a somewhat lighter tone and brighter print if the original black print was too dark.

Throughout the specification and claims it will be understood that my invention is applicable not only to monochrome prints but to multi-color prints in which field it is a very valuable combinative factor. It is to be understood furthermore that the invention is applicable to all sorts of prints whether they be paper prints, transparencies, lantern slides, films for moving pictures or other photographic productions or reproductions.

The foregoing disclosure and discussion has been made as full and complete as possible and with absolute frankness, reliance being placed on the protection to be afforded by patent commensurate with applicant's contribution to the art. The invention as conceived by applicant is defined in the following claims.

What I therefore claim and desire to secure by Letters Patent is:—

1. The method of producing colored photographic prints consisting in converting the metallic detail to a salt, in producing an ammoniacal differentiation in the gelatine adjacent the loci of the detail and the rest of the gelatine film, and in dyeing with a dye of Alizarin type.

2. The method of producing colored photographic prints consisting in producing a differentiation in the gelatine immediately adjacent the loci of the metallic detail whereby such modified gelatine is receptive to a dye in the presence of ammonia to the exclusion of the untreated gelatine constituting areas of high light which is unaffected by the dye in the presence of the ammonia.

In testimony whereof I affix my signature.

WILLIAM R. WHITEHORNE.